Patented Dec. 29, 1931

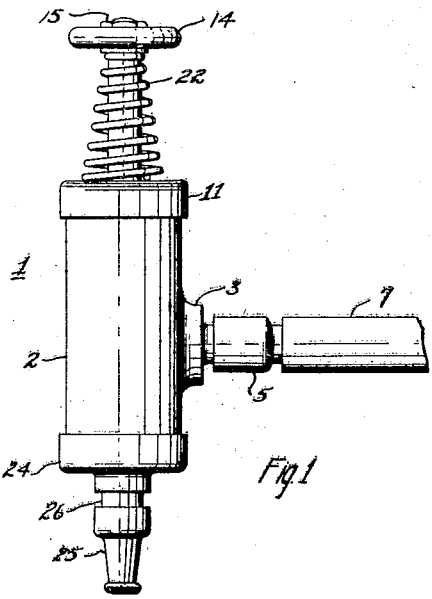

1,838,093

UNITED STATES PATENT OFFICE

LEO L. DA COSTA, OF BROOKLYN, NEW YORK, ASSIGNOR TO DA COSTA COMPANY, INC., OF NEW YORK, N. Y., A CORPORATION OF NEW YORK

DISPENSING FAUCET

Application filed February 18, 1930. Serial No. 429,347.

This invention, relates generally, to faucets, and the invention has reference, more particularly, to dispensing faucets.

Dispensing faucets as heretofore commonly constructed employ plungers having sealing gaskets which plungers move within cylinders and actuate by actual physical contact the liquid contained therewithin. The actual physical contact of such plungers and particularly their sealing gaskets with the dispensed liquid is objectionable, especially since the gaskets used are of fibrous material and are commonly subject to rapid deterioration while contacting with the dispensed liquid and which therefore cause the dispensed liquid to have an unpleasant taste or even render the same unfit for use.

The principal object of the present invention is to provide a novel faucet for dispensing liquids in measured quantities, said faucet being so constructed and arranged that its operating parts do not contact with the liquid dispensed by the faucet.

Another object of the present invention lies in the provision of a dispensing faucet which is of simple, sturdy construction, is reliable in use and has a long life in actual practice.

Other objects of this invention not at this time more particularly enumerated, will be clearly understood from the following detailed description of the same.

The invention is clearly illustrated in the accompanying drawings, in which:—

Fig. 1 is a view in side elevation of the novel dispensing faucet of this invention attached to a liquid supply pipe.

Fig. 2 is an enlarged vertical sectional view of the structure shown in Fig. 1, the faucet being shown in its normal charged position with the piston thereof at its upper limit of motion; and Fig. 3 is a view similar to Fig. 2 but illustrates the faucet in its discharged position with the piston thereof at its lower limit of motion.

Similar characters of reference are employed in all of the above described views, to indicate corresponding parts.

Referring now to said drawings, the reference numeral 1 designates the novel dispensing faucet of this invention as a whole. Dispensing faucet 1 comprises a hollow cylindrical casing 2. Casing 2 is formed about midway of its height with a radially extending boss 3 at one side thereof, said boss having a reduced threaded extension 4 upon which a suitable pipe fitting 5 containing a check valve is threaded. Boss 3 is provided with an interior liquid inlet passage 6 which communicates through fitting 5 to a supply pipe 7 that is threaded to fitting 5. Pipe 7 is adapted to be connected to a suitable reservoir or other source of supply serving to furnish liquid to faucet 1 to be dispensed by the latter. The outer end of the reduced extension 4 is provided with radial serrations or slots 8 for cooperating with the disc check valve 9 positioned within fitting 5. Liquid may flow freely from pipe 7 into fitting 5, around disc check valve 9 through slots 8 and passage 6 into the interior of casing 2, but a reverse flow of liquid or air is prevented by the closing of check valve 9.

The upper outer end portion of casing 1 is threaded at 10 and a screw cap 11 is threaded upon this upper portion of the casing. An aperture 12 extends longitudinally through the cap 11 and connects the interior of the dispensing faucet with the exterior thereof. Screw cap 11 is provided with an axial slide bearing aperture 30 accommodating a plunger-rod 13. An operating handle 14 is mounted on an upper reduced end portion of plunger-rod 13 exteriorly of casing 2 and is retained in place on this plunger-rod as by a nut 15 and washer 16. Plunger-rod 13 extends downwardly into casing 2 and is provided with a reduced portion at its lower end upon which is mounted a piston 17. Piston 17 is vertically slidable within the casing 2 and comprises end plates 18 and intermediate gaskets or washers 19 preferably of fibrous material such as leather or composition material. End plates 18 and washers 19 are retained in assembled position upon reduced lower end portion of the plunger-rod as by a nut 20. The gaskets 19 fit snugly against the inner walls of the casing 2, thereby substantially preventing the flow of air or other fluid from one side to the other of the piston 17. A washer 21 of fibrous material preferably similar to the gaskets 19 is mounted upon the upper surface of the piston 17 and moves with this piston within the casing 2 of the dispensing faucet. The outer portion of plunger-rod 13 is surrounded by a compression spring 22 which bears at one end against the cap 11 and at its other end against the washer 16 and tends to urge the plunger-rod outwardly of casing 1, thereby urging piston 17 upwardly within this casing. Under the biasing action of spring 22 the piston 17 is normally retained in its uppermost position within the dispensing faucet. In this position of the piston, the washer 21 directly underlies and closes aperture 12 and also seals bearing aperture 30 in cap 11 thereby preventing the escape of air or other fluid from within the dispensing faucet.

The lower end portion of the casing 22 is exteriorly threaded at 23 to receive a threaded cap 24. Cap 24 is provided with a central threaded aperture for receiving a pipe fitting 26 containing a ball check valve comprising a ball 27 and a spring 28. Spring 28 urges ball 27 upwardly against its seat, thereby normally preventing the escape of liquid from the interior of casing 2. A discharge mouth 25 is threaded upon the lower end of fitting 26.

In use, liquid to be dispensed is supplied through pipe 7 and partially fills the dispensing faucet, the ball check valve 27—28 preventing the escape of liquid from the dispensing faucet. The liquid level of the supplied liquid is indicated at 29 in Fig. 2 which liquid level is illustrated as positioned substantially half way of the height of the dispensing faucet. To discharge a measured quantity of liquid from the faucet 1 it is merely necessary to press downwardly upon the operating handle 14, thereby moving the piston 17 downwardly within the casing 2 and causing the air below piston 17 to drive the liquid within the dispensing faucet outwardly thereof through discharge mouth 25, the ball check valve 27—28 opening to permit this flow. Downward movement of piston 17 does not create a resisting vacuum above the same since aperture 12 permits air to flow readily into the dispensing faucet above piston 17. As piston 17 moves downwardly, the air imprisoned below the same forces the liquid level 29 downwardly until, when the piston 17 reaches the lower limit of its travel, which is determined by the length of plunger-rod 13, this liquid level has descended to the position 29′ shown in Fig. 3. The measured quantity of liquid dispensed is that included between the liquid levels 29 and 29′ and obviously this quantity may be varied as desired by suitably varying the proportions of the casing 2 and plunger 13. When the handle 14 is released, the spring 22 automatically returns this handle to its normal upper position with the piston 17 at the upper limit of its travel, and with aperture 12 closed by washer 21. The upward movement of piston 17 causes another measured quantity of liquid to enter the faucet 1 through passage 6.

Since washer 21 seals the aperture 12 within the upper part of the dispensing faucet as well as the slide bearing 30, the predetermined desired quantity of air contained below piston 17 and above liquid level 29 always is retained within the dispensing faucet, thereby preventing liquid supplied from pipe 7 from filling the dispensing faucet above the liquid level 29 and contacting with piston 17. This is an important feature of the present invention for by constantly maintaining this piston of air below piston 17 the direct contact of piston 17 with the liquid dispensed is rendered unnecessary. It will be noted that when piston 17 is at the lower limit of its travel, it is still positioned above the highest position of the liquid level 29 so that this piston does not contact with the film of liquid remaining on the inner walls of casing 2 after the liquid level has fallen to 29′. Since the piston 17 never descends as low as the liquid level 29 it is impossible for actual physical contact between the dispensed liquid and the piston 17 to take place.

It will be noted that the novel dispensing faucet of the present invention is of extremely simple rugged construction, comprising in effect but a single moving part which does not contact with the liquid dispensed, thereby causing the faucet to have a long life in use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. A dispensing faucet comprising a casing having an inlet opening and an outlet opening, a piston movable within said casing between an end thereof and said inlet opening so as to provide a volume of air between said piston and said openings, said piston being operative to draw liquid into said casing through said inlet opening and to discharge the same through said outlet opening, said casing having an aperture in the end thereof at the rear of said piston, and means carried by said piston for sealing said aperture when said piston is at the rear end of its travel, to thereby maintain said volume of air in advance of said piston.

2. A dispensing faucet comprising a cylindrical casing having an inlet opening positioned substantially midway of its height and an outlet opening at its lower end, an inwardly opening check-valve for said inlet opening, a piston movable in the upper portion of said casing between said inlet opening and the upper end of said casing to confine a volume of air within said casing below said piston, spring means operative to move said piston upwardly within said casing to draw a measured quantity of liquid into said casing, said casing having an aperture in its upper end, said piston having means for sealing said aperture when said piston is at the upper limit of its travel, whereby the confined volume of air below said piston is retained within said casing, thereby prohibiting excess liquid from flowing into said casing and contacting with said piston, said piston being movable downwardly within said casing to cause the confined volume of air below the same to discharge said measured quantity of liquid out through said discharge opening, and an outwardly opening check valve for said discharge opening.

In testimony, that I claim the invention set forth above I have hereunto set my hand this 15th day of February, 1930.

LEO L. DA COSTA.